Aug. 31, 1937.   E. WILDHABER   2,091,575
METHOD OF CUTTING GEARS
Filed July 30, 1935   2 Sheets-Sheet 2

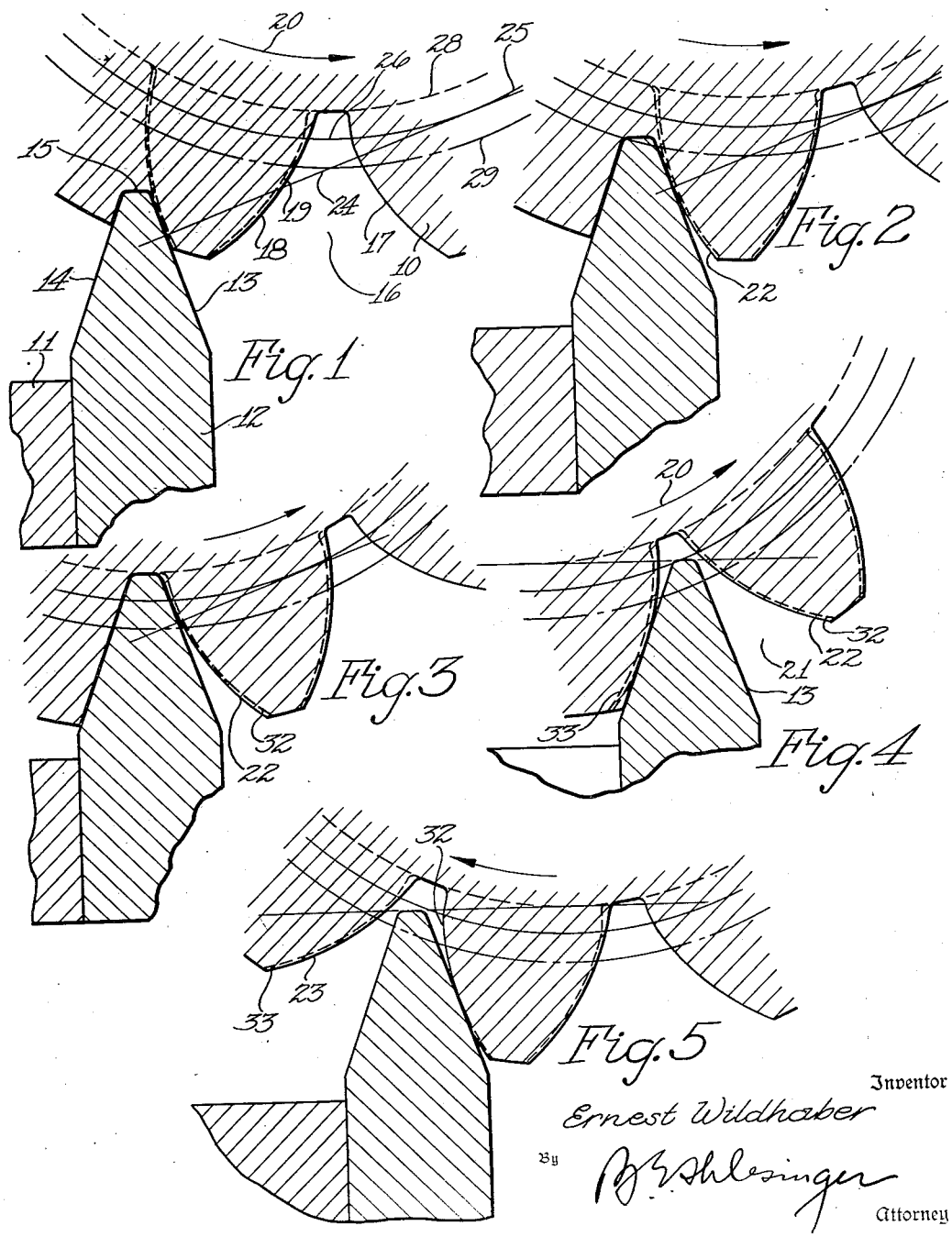

Inventor
Ernest Wildhaber
By
Attorney

Patented Aug. 31, 1937

2,091,575

UNITED STATES PATENT OFFICE 2,091,575

METHOD OF CUTTING GEARS

Ernest Wildhaber, Irondequoit, N. Y., assignor to Gleason Works, Rochester, N. Y., a corporation of New York Application July 30, 1935, Serial No. 33,833

18 Claims. (Cl. 90—4)

The present invention relates to the production of gears and particularly to the production of the generated members of spiral bevel and hypoid gear pairs although it has application generally to the production of all forms of generated gears.

One object of the invention is to provide a method for successively rough and finish cutting side surfaces of generated gear teeth in the same set-up and with the same tool.

A further object of the invention is to provide a method for successively rough and finish cutting side surfaces of generated gear teeth with the same tool and in the same set-up in which the cutting edge or edges at one side of the tool does or do substantially no work during roughing but are saved for the finishing operation so that tooth surfaces may be finish cut by the present method which are equally as smooth as tooth surfaces cut in separate roughing and finishing operations with separate roughing and finishing tools according to prior practice.

Another object of the invention is to provide a method for successively rough and finish cutting side surfaces of generated gear teeth in which both sides of a tooth slot are rough-generated during feed and roll in one direction and one side of the slot is finish-generated during roll in the opposite direction without any relative set-over of tool or blank between the opposite rolling movements.

Still another object of the invention is to provide a method for cutting spiral bevel and hypoid pinions through which one of the steps heretofore required may be eliminated and the pinion may be roughed out and have one side of the teeth finish-cut in a single operation.

Other objects of the invention will be apparent hereinafter from the specification and from the recital of the appended claims.

In the production of spiral bevel and hypoid pinions, it has been the practice heretofore to employ three separate cutting operations. In the first operation the tooth slots of the pinion are roughed out to approximate finished shape. In the second operation one side of the teeth is finish cut and in the third operation the other side of the teeth is finish cut. Sometimes, the finish cutting operations are done successively on the same machine by setting-over the blank and tool between the finishing cuts. In high production work, however, the practice is to finish cut one side of the teeth on one machine and finish cut the opposite side of the teeth on a separate machine.

With the present invention, the tooth slots are roughed out and one side of the teeth finish cut in one operation and in one set-up. The other side of the teeth is then finish-cut in a separate operation. Thus, instead of three separate operations for producing the finished pinion, but two operations are now required. The present invention, therefore, effects a saving in production time due to elimination of one set-up and in most cases of one chucking but it also makes possible further material savings in production costs through reduction in the amount of machinery and in the number of cutting tools required.

In producing gears according to the present invention, the cutting tool is fed relatively into the blank during roll in one direction at such a rate relative to the roll that one side of the tool does no cutting or a reduced amount of cutting during the depth feed and the roughing cuts are taken entirely or principally by the tip and the other side of the tool. Hence, one side of the tool is saved for the finishing cut. In the feed, the tool moves substantially in the direction of the finishing edge and the roll is so timed to the feed movement that the finishing edge follows the profile curve of the tooth side which it is subsequently to finish. The movement of the tool relative to the blank during feed is as though the tool were traveling along the line of action between the tool and the blank while the work is turning on its axis through an angle equal to the distance that the tool travels on the line of action measured on the base circle of the gear. After full depth position is reached, the tool and blank continue to roll relative to one another in the same direction as during feed but at a changed rate until the generation of one side of the tooth slot is completed. Then the roll is reversed and the finishing side of the tool finish generates the opposite side of the tooth slot. The rate of roll, after full depth position is reached, is the rate commonly employed in known practice and is as though the work were meshing with a basic gear represented by the tool.

In the drawings:

Figs. 1 to 5 inclusive are diagrammatic views illustrating different steps in the roughing out of a tooth slot and the finish-cutting of one side of the same by the method of the present invention, Figs. 1, 2 and 3 showing different positions of the tool and the blank during the feed of the tool into full depth position, Fig. 4 showing one relative position of the tool and blank after the tool has reached full depth position and while the blank is still rolling in the same direction as during feed, and Fig. 5 showing one of the positions of tool and blank after the roll has been reversed and while the tool is finish-cutting one side of the tooth slot;

Figure 7:
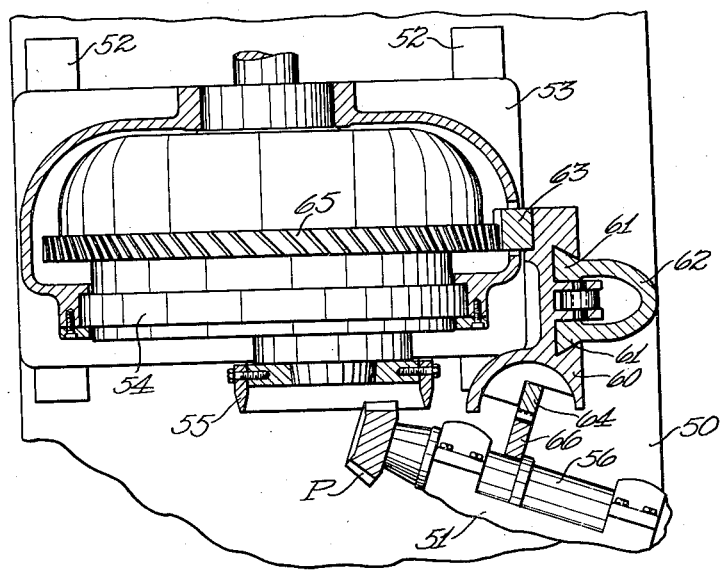
Fig. 7 is a plan view, partly in section and more or less diagrammatic, illustrating one type of machine which may be employed in practicing the method of the present invention.

The invention will be described particularly with reference to the cutting of spiral bevel and hypoid pinions although, as has already been stated, it has application to the production of all forms of generated gears.

Referring first to Figs. 1 to 5 inclusive, 10 designates a pinion to be cut and 11 a face-mill gear cutter such as may be employed in the cutting of the same. The face-mill cutter may be of usual construction having a plurality of cutting blades 12, having outside, inside and tip cutting edges 13, 14 and 15, respectively. The side-edges of the blades may be of any suitable pressure angle but preferably the included pressure angle between opposite sides of the blades is equal to the included pressure angle between opposite sides of the tooth spaces of the gear to be cut. The point-width of the tool is preferably made slightly less than the width of the bottom of a finished tooth space of the gear so that stock will be left on one side of the tooth space to be cleaned up in a subsequent finishing operation as will hereinafter appear.

For the purpose of illustration, I have shown the cutter as provided with blades having both the inside and outside cutting edges as well as a tip cutting edge. It will be understood, however, that the cutter may have its inside and outside cutting edges on different blades according to more usual practice. The cutter might also be of that form in which the tip cutting edges are provided on separate blades according to known construction. The cutter forms no part of the present invention and therefore may be of any usual or suitable construction.

The gear 10 is shown with a tooth space 16 of which one side 17 has been finish generated and the other side 18 has been rough generated. The dotted line 19 indicates the position which the latter side of the tooth space will occupy after the finish generation. The tool 11 is shown in the operation of cutting the next adjacent tooth space 21 of the gear.

Either of the side cutting edges of the tool may be made the finish cutting edge. In the drawings, the outside cutting edges 13 are the finish cutting edges and the roughing cuts are taken by the inside cutting edges 14 and the tip cutting edges 15.

Fig. 1 shows the position of the cutter and work at an early stage of the feed movement. Fig. 2 shows the positions of cutter and blank at a further stage of the feed movement and Fig. 3 shows the positions of the cutter and blank at the final stage of the feed movement when the cutter has reached full depth position. During the whole of the feed movement, the work rotates in the direction of the arrow 20 and at such a rate relative to the feed movement, that the outside cutting edges 13 follow the curve 22 which lies in the rough-generated side of the tooth slot. The relative path of the tool during feed is such as if the tool were fed along the line of action 24 tangent to the base circle 25 of the gear while the blank is turned on its axis through an angle equal to the distance travelled by the tool along the line 24 plotted on the base circle 26 of the gear. It is evident that during the feed movement, the outside cutting edges 13 do no cutting and that the roughing out of the tooth slot 21 is done by the inside and top cutting edges 14 and 15 only.

28 and 29 designate, respectively, the root and pitch circles of the gear.

When full depth position has been reached one side 22 of the tooth slot 21 will have been rough generated. Sufficient stock only is left on this side to clean up in the finishing operation. The dotted line 32 designates the position of the finish generated tooth surface.

After full depth position is reached, the blank is rolled on in the direction of the arrow 20 so as to complete the rough generation of the opposite side 23 of the tooth slot 21. The rate of roll of the blank is changed, however, after full depth position is reached so as to cause the tool to cut a substantially involute tooth profile on the side 23, that is, a rate of roll is employed after full depth position is reached which is the same as employed in ordinary practice in generating gear teeth and which corresponds to the rolling movement of the gear to be cut with the basic gear such as a rack, crown gear, or mate gear represented by the tool.

Fig. 4 shows one of the positions of the tool and blank during the rough generation of the side 23 of the tooth space 21. The inside cutting edges 14 of the tool at this stage are cutting the profile shape. The dotted line 33 indicates the position of the finished tooth profile, sufficient stock being left on to clean up in the finish generating operation.

When the rough generation of the profile 23 is completed, the roll is reversed. The tool remains at full depth and tool and blank roll together in the opposite direction. During this reverse roll, the finish cutting edges 13 of the tool remove the stock left on the gear tooth side 22 in the rough generating operation and produce the final finished tooth surface 32. Fig. 5 shows the positions of cutter and blank at one stage in the finish generation of the side 32.

After one tooth space has been roughed out and one side thereof finish-generated, the tool is withdrawn relatively from the work and the work is indexed. Then the tool is again fed into the work to cut a new tooth slot. So the operation proceeds until all of the tooth slots have been cut.

Figure 6:
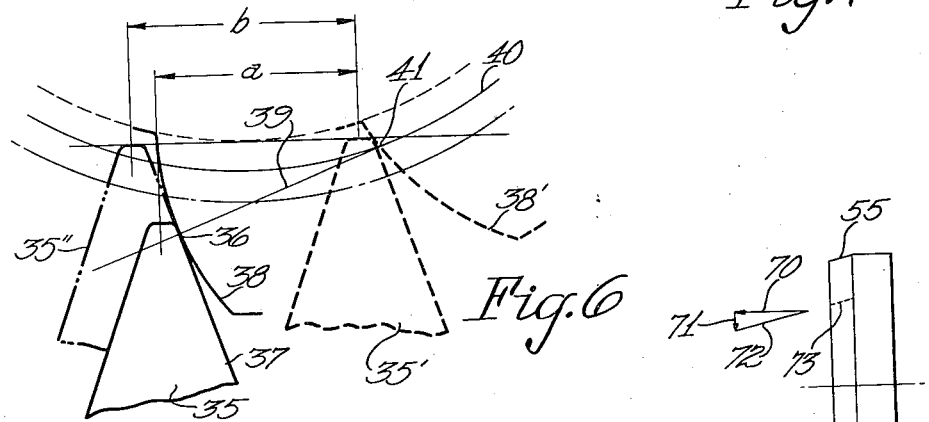
Fig. 6 is a diagrammatic view illustrating the difference between the relative movements of tool and blank during the feed and during finish cutting.

The difference between the rates of relative movement of the tool and the work during feed and during finish cutting are illustrated diagrammatically in Fig. 6. 35 designates a position of the tool at an early stage in the feed movement when the finishing side 37 of the tool is tangent to the tooth surface 38 of the gear at a point 36 on the line of action 39 tangent to the base circle 40 of the gear. The positions of the tool and tooth surface when the tool has reached full depth are indicated in dash-lines at 35' and 38' respectively.

The tool is tangent to the tooth side 38' at a point 41 on the line of action 39. In the finish cutting of the tooth side 38, the tool remains at full depth and the tool and blank roll in the opposite direction from that in which they rolled during the feed movement. 35'' designates the position of the tool in the finishing operation when the tooth surface has rolled back to the position 38 and the side 37 of the tool is again tangent to the tooth surface 38 at the point 36.

Except for the stock-allowance, the blank has rotated the same distance between the two positions of feed as between the two positions of finish cutting but between the two positions of feed, the tool travels a different linear distance $a$ from the linear distance $b$ traveled between the two positions of finish cutting. The difference in distances of travel of the tool is due to the rates at which the work is rolled relative to the tool during feed and during finish cutting. During feed, the work is rolled relative to the tool at a rate to cause the tool to follow the tooth surface of the blank which is subsequently to be finish cut. During finish cutting, the work is moved relative to the tool at a rate corresponding to the rate of roll of the work with a basic gear to which the work is being generated conjugate and which is represented by the tool.

By the method of this invention a tooth space is roughed out and one side of the tooth space is finish generated in one complete feed and rolling movement. The other sides of the tooth spaces are then finish cut in a separate operation. This may be effected according to known methods of finish generating gears.

Various forms of gear cutting machines may be employed in practicing the present invention. Fig. 7 illustrates diagrammatically one form of machine which is particularly suited for cutting gears according to this invention. This form of machine is described more in detail in my copending application Serial No. 24,198 filed May 31, 1935, but may be briefly described here.

50 designates the base or frame of this machine. The work-head 51 is mounted on this base or frame and may be adjustable thereon in any suitable or desired manner. The base or frame is also provided with ways 52 for a slide 53 which is in the form of a housing in which the cradle 54 is journaled. The face-mill gear cutter 55 is secured to a cutter spindle that is journaled in this cradle. The gear blank P to be cut is secured to the work spindle 56 which is journaled in the work-head 51.

The generating motion of this machine is produced by reciprocation of a slide 60 which slides on ways 61 formed on a column 62 which is secured to the base or frame of the machine and extends in a direction perpendicular to the plane of the drawings. The slide 60 carries two racks designated at 63 and 64, respectively. These are fixedly secured to the slide. The rack 63 is provided with helical teeth and meshes with a helical gear 65 which is secured to the cradle 54 of the machine. The rack 64 meshes with a spur gear segment 66 which during generation is connected to the work spindle of the machine.

The depth feed of the cutter into the work for roughing is obtained by bodily movement of the slide 53 upon the ways 52 of the machine. During this movement, due to the helical teeth on the gear 65 and rack 63, the cradle 54 will be rotated on its axis. This rotary movement of the cradle will be combined with the rotary movement imparted to the cradle, through the reciprocation of the slide 60 and the rack 63, and so the cutter will be rolled relative to the rotating gear blank during the feed movement at a rate to cause the side cutting edges at one side of the cutter to follow one side of the tooth slot as the cutter feeds into depth.

When full depth position is reached, the feed is stopped, but the roll of the cutter relative to the work is continued. Its direction will be the same as during infeed until the opposite side of the tooth slot has been rough generated. Then the roll is reversed by reversal of movement of the slide 60 and the side of the tooth slot which has been roughed out in the feed movement is then finish generated. When the finish generating movement has been completed, the slide 53 is withdrawn to withdraw the tool from operative relation with the blank and then the blank is indexed. The cam which controls the movement of the slide 53 will, therefore, be so shaped as to cause movement of this slide for feed, dwell of the slide in full depth position while the rough-generating operation is completed and during finish generation of one side of the tooth slot, and then withdrawal of the slide to permit of indexing of the work.

Figure 8:
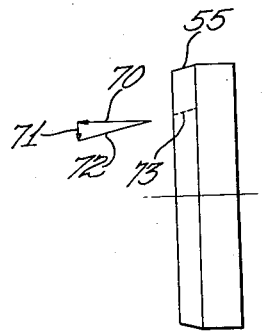
Fig. 8 is a diagrammatic view illustrative of the relative movement of the tool during feed.

In the machine illustrated, the cutter moves bodily along the tangential plane as it moves into depth, that is, as it moves bodily into depth in the direction of the arrow 70 Fig. 8, it is moved downwardly in the direction of the arrow 71 due to the rotation of the cradle and the resulting motion is, therefore, in the direction of the arrow 72 which is parallel to a line 73 of the cutting surface of the cutter at a mean point of contact between the cutter and the work.

The depth feed may be at a uniform or a non-uniform rate, as desired. Where the depth feed is at a uniform rate, the work has a constant turning movement relative to the tool during feed but this constant movement is at a different rate from that during finish cutting for, as in the machine illustrated, during feed the helical gearing 65—63 operates to combine a rotational movement of the cradle due to the sliding movement of the slide 53 and the helical direction of the teeth of the gearing 65 and 63 with a rotational movement of the cradle due to the reciprocation of the slide 60, while during generation at full depth position, the slide 53 is stationary and the relative rotations of the cradle 54 and work spindle 56 are controlled entirely by the movement of the slide 60.

The present invention may also be practiced on a gear cutting machine of the type disclosed in the patent to Carlsen No. 2,000,215 of May 7, 1935. This machine differs from the machine illustrated in Fig. 7 in that relative feed of the tool and work is obtained by movement of a sliding base on which the work-head is mounted and in that the relative rolling movement of the tool and blank is produced through a train of gearing which connects the cradle and the work spindle.

Figure 9:
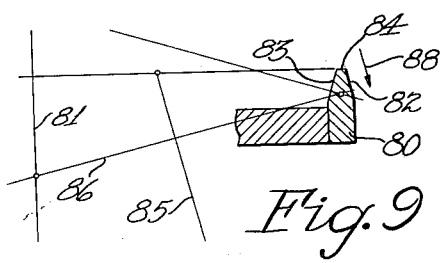
Fig. 9 is a diagrammatic view illustrating how the method of the present invention may be practiced on a machine of known type but of different character from that illustrated in Fig. 7.

A machine of the type described in the Carlsen patent should be adjusted in a manner illustrated diagrammatically in Fig. 9 of the drawings of the present application. In this figure, 80 designates a face-mill gear cutter whose axis is at 81 and which has outside cutting edges 82, inside cutting edges 83 and top cutting edges 84. 85 designates the axis of the tool carrying cradle. To use this machine to practice the present invention, the cutter should be so adjusted angularly relative to the axis 85 of the cradle that the cradle axis is perpendicular to a normal 86 to the outside cutting surface 82 of the cutter. That is, the cutter should be adjusted angularly on the cradle so that the axis of the cradle would be substantially parallel to the outside cutting edges of the cutter. Then when the sliding base is moved on the frame of the machine, to feed the work into the cutter, the feeding movement will be in the direction of the arrow 88, parallel to the axis 85 of the cradle and in the direction of the outside cutting edges 82 of the cutter. Hence, during the in-feed movement, the outside cutting edges of the cutter do not have to do any work but are saved for the finishing operation. During the in-feed movement of the work, the work will be rolled relative to the cutter to cause the outside cutting edges to follow the profile of one side surface of the tooth slot. When full depth position is reached, feed will be stopped and the rolling movement will proceed first in one direction and then in the other to complete the rough generation of the tooth slot and effect finish generation of one side of the slot in the manner already described.

The invention is not limited to use with face-mill gear cutters but may be practiced with any suitable form of tool and upon any suitable form of machine. This application is intended to cover any variations, uses, or adaptations of the invention following, in general, the principles of the invention and including such departures from the present disclosure as come within the known or customary practice in the art to which the invention pertains and as may be applied to the essential features hereinbefore set forth and as fall within the scope of the invention or the limits of the appended claims.

Having thus described my invention, what I claim is:

1. The method of cutting longitudinally curved tooth gears which comprises employing a face-mill cutting tool having a tip and opposite side cutting edges and rotating the tool and a gear blank on their respective axes while producing a relative feed movement between the tool and blank at such a rate relative to the rotation of the blank that stock is removed from a tooth space principally by one side and the tip of the tool and the other side does little or no cutting during the feed.

2. The method of cutting a gear which comprises employing a tool having a tip and opposite side cutting edges and, while imparting a cutting movement to the tool and a relative feed movement between the tool and blank, rotating the blank on its axis and effecting a relative movement of translation between the tool and blank, the last two motions being so timed to one another that one side of the tool follows approximately the profile of one side of a tooth space during the feed movement and stock is removed from the tooth space principally by the opposite side and tip of the tool.

3. The method of cutting a tapered gear which comprises employing a tool having a tip and opposite side cutting edges imparting a cutting movement to the tool while rotating the blank on its axis and producing a relative rotational movement between the tool and blank about another axis angularly disposed to the axis of the blank and simultaneously effecting a relative feed movement between the tool and blank in the direction of the last named axis, said rotational movements being so timed to one another that, during feed, stock is removed from a tooth space of the blank principally by one side and the tip of the tool and the other side of the tool does little or no cutting.

4. The method of cutting a gear which comprises employing a tool having a tip and opposite side cutting edges, and imparting a cutting movement to the tool while rotating the blank at a uniform rate on its axis, and producing a relative rotational movement at a uniform rate between the tool and blank about another axis, and simultaneously effecting a relative depthwise feed movement between the tool and the blank, said rotational movements being so timed to one another that during feed stock is removed from a tooth space of the blank principally by one side and the tip of the tool and the other side of the tool does no cutting.

5. The method of cutting a gear which comprises employing a tool having tip and opposite side cutting edges, positioning the tool in engagement with the gear blank and producing a relative feed movement between the tool and blank in a direction parallel to one side of the tool while rotating the blank on its axis and producing a relative movement of translation between the tool and the blank at such a rate relative to the feed movement that stock is removed from a tooth space of the blank during the feed principally by the opposite side and tip of the tool.

6. The method of cutting a gear which comprises employing a rotary face-mill gear cutter having a tip and opposite side cutting edges, positioning the tool in engagement with a gear blank and producing a relative feed movement between the tool and blank in a direction inclined to the axis of the cutter while rotating the blank on its axis and producing a relative movement of translation between the tool and the blank at such a rate relative to said feed movement that stock is removed from a tooth space of the blank during the feed principally by one side and the tip of the tool.

7. The method of cutting a gear which comprises employing a tool having tip and opposite side cutting edges and producing a relative feed movement between the tool and the blank until the tool reaches full depth position while rotating the blank on its axis and simultaneously producing a relative translatory movement between the tool and the blank, and discontinuing the feed movement after full depth position has been reached and then changing the ratio of the rotational and translatory movements, the ratio of the rotational and translatory movements during the feed being such that one side of the tool follows the profile at one side of a tooth space of the blank during feed, and the ratio of the rotational and translatory movements being changed after full depth position is reached so that the tool and blank roll together as though the blank were meshing with a basic gear represented by the tool.

8. The method of cutting a gear which comprises employing a tool having tip and opposite side cutting edges, producing a relative feed movement between the tool and a gear blank until the tool reaches full depth position, while producing relative rotational movements between the tool and blank about two separate axes, and discontinuing the relative feed movement after full depth position is reached and simultaneously changing the ratio of the relative rotational movements, the ratio of said rotational movements during feed being such that one side of the tool approximately follows the profile of one side of a tooth space of the blank during feed, and the ratio of said rotational movements being changed after full depth position is reached so that the tool and blank roll together as though the blank were meshing with a basic gear represented by the tool.

9. The method of cutting a gear which comprises employing a tool having tip and opposite side cutting edges, imparting a cutting movement to the tool and simultaneously producing relative rotational movements between the tool and blank about two separate axes in given directions while effecting a relative depthwise feed movement between the tool and blank until the tool reaches full depth position, then stopping the feed movement and reversing the directions of said rotational movements, the ratio of the rotational movements during feed being such that stock is removed from a tooth space of the blank principally by one side and the tip of the tool and the opposite side of the tool does little or no cutting, and the ratio of the rotational movements, after reversal, being such that the tool and the blank roll together in the manner of a pair of meshing gears and the last named side of the tool finish cuts one side of the tooth space.

10. The method of cutting a gear which comprises employing a tool having tip and opposite side cutting edges, imparting a cutting movement to the tool while rotating a gear blank on its axis in one direction and simultaneously producing a relative translatory movement between the tool and blank in one direction, and effecting a relative feed movement between the tool and the blank until the tool reaches full depth position then stopping the feed movement and reversing the directions of the rotational and translatory movements, the ratio of the rotational and translatory movements during feed being such that stock is removed from a tooth space of the blank principally by one side and the tip of the tool and the opposite side of the tool follows approximately the profile at one side of the tooth space doing little or no cutting, and the ratio of the rotational and translatory movements, after reversal being such that the tool and blank roll together in the manner of a pair of meshing gears and the last named side of the tool finish generates the specified side of the tooth space.

11. The method of cutting a gear which comprises employing a tool having tip and opposite side cutting edges, and producing a relative feed movement between the tool and a gear blank until the tool reaches full depth position while rotating the blank on its axis in one direction and simultaneously producing a relative movement of translation between the tool and the blank in one direction in such timed relation to the rotational and feed movements that one side of the tool follows approximately one side of a tooth space of the blank and stock is removed from the tooth space principally by the opposite side and tip of the tool, discontinuing the feed movement when the tool reaches full depth position but continuing the rotational and translatory movements in the previous directions but at a different timed relation so that the tool and blank roll relative to one another in the manner of meshing gears until the side of the tooth space opposite that first specified is rough-generated, and then reversing the directions of the rotational and translatory movements while maintaining the last described timed relation so that the first specified side of the tooth space is finish-generated by the first specified side of the tool.

12. The method of producing tooth surfaces of a gear conjugate to a given basic gear which comprises employing a tool having tip and opposite side cutting edges, and producing a relative feed movement between the tool and a gear blank at a uniform rate while rotating the blank on its axis at a uniform rate and simultaneously producing an additional relative rotational movement at a uniform rate between the tool and blank about another axis representing the axis of the basic generating gear, the two rotational movements being so timed to one another that a tooth slot of the blank is roughed out principally by one side and the tip of the tool, discontinuing the feed movement after the tool reaches full depth position, and then changing the ratio of the two rotational movements so as to cause the tool and the blank to roll relative to one another as though the blank were meshing with the basic gear represented by the tool.

13. The method of producing a gear which comprises employing a tool that has a tip and opposite side cutting edges, producing a relative feed movement between the tool and the blank while effecting a relative rolling movement between the tool and blank and while superimposing upon said rolling movement an additional rotational movement to cause the tool to follow one side of a tooth space of the blank as it feeds into depth, and, after full depth position has been reached, discontinuing both the feed and said additional rotational movement so as to cause the tool and the blank to roll together to generate one side of the tooth space.

14. The method of producing a gear which comprises employing a tool having a tip and opposite side cutting edges, producing a relative feed movement between the tool and a gear blank while rolling the tool and blank relative to one another and simultaneously superimposing upon said rolling movement a relative rotational movement of the tool and blank so that the stock is removed from a tooth space of the blank during the feed movement principally by the tip and one side cutting edge of the tool, stopping said feed movement and also said superimposed rotational movement after the tool has reached full depth position, but continuing the rolling movement between the tool and blank in the same direction as during feed until the opposite side of the tooth space has been formed, and then reversing said rolling movement and finish-generating the first mentioned side of the tooth space with the opposite side cutting edge of the tool.

15. The method of producing a gear which comprises employing a tool having tip and opposite side cutting edges, producing a relative depthwise feed movement between the tool and a gear blank while rotating the blank on its axis at such a rate during the relative feed movement that all or a greater part of the stock is removed from a tooth space of the blank by the tip and one side cutting edge of the tool and, after the tool has reached full depth position, reversing the direction of rotation of the blank and rolling the tool and blank together in the manner of a pair of meshing gears to finish-cut one side of the tooth space with the side of the tool opposite to that last mentioned.

16. The method of cutting a tapered gear which comprises employing a tool having a tip and opposite side cutting edges, imparting a cutting movement to the tool while rotating the blank on its axis and producing a relative rotational movement between the tool and the blank about another axis angularly disposed to the axis of the blank and simultaneously effecting a relative feed movement between the tool and blank in a direction parallel to one of the side cutting edges of the tool until full depth position is reached.

17. The method of producing a tapered gear which comprises employing a rotary face-mill gear cutter that has tip and opposite side cutting edges, rotating the cutter on its axis in engagement with a gear blank while rotating the blank on its axis and simultaneously producing a relative movement between the tool and blank about an axis inclined to the blank axis and approximately parallel to one side cutting edge of the tool, and producing a relative feed movement between the tool and the blank approximately in the direction of said side cutting edge of the tool until full depth position is reached.

18. The method of cutting a gear which comprises employing a tool having tip and opposite side cutting edges, feeding the tool into a gear blank while rolling the tool and the blank relative to one another at such a rate relative to the feed that the cutting is done principally by one side and the tip cutting edges of the tool and the feed is substantially in the direction of the other side cutting edge of the tool, discontinuing the feed after full depth position is reached and then changing the rate of the rolling movement and reversing the direction thereof to cause the tool and blank to roll together as though the blank were meshing with a basic gear represented by the tool and to cause the tool to finish-cut with the last named side of the tool.

ERNEST WILDHABER.